United States Patent [19]

Mercurio

[11] 3,904,795

[45] Sept. 9, 1975

[54] ARTICLES AND METHOD FOR FORMING THEM USING HEATFUSIBLE COATINGS FROM AQUEOUS DISPERSIONS OF WATER-INSOLUBLE POLYMERS

[75] Inventor: Andrew Mercurio, Hatboro, Pa.

[73] Assignee: Rohm & Haas Company, Philadelphia, Pa.

[22] Filed: Apr. 19, 1973

[21] Appl. No.: 352,836

[52] U.S. Cl.......... 427/375; 260/29.6 TA; 427/379; 427/407; 427/421; 427/428; 427/429; 428/463; 260/29.6 TA
[51] Int. Cl.$^2$..B32B 15/08; B32B17/10;C03C 17/32
[58] Field of Search......... 117/124 E, 132 B, 132 C, 117/161 UZ; 260/29.6 TA

[56] References Cited
UNITED STATES PATENTS

| | | | |
|---|---|---|---|
| 2,754,280 | 7/1956 | Brown et al. | 117/132 |
| 2,795,564 | 6/1957 | Conn et al. | 260/29.6 TA |
| 2,949,445 | 8/1960 | Blake | 117/124 E |
| 2,954,358 | 9/1960 | Hurwitz | 117/124 E |
| 3,150,118 | 9/1964 | Clemens | 117/132 |
| 3,194,777 | 7/1965 | Christenson et al. | 117/132 |
| 3,261,796 | 7/1966 | Simms | 260/29.6 TA |
| 3,266,930 | 8/1966 | Emmons et al. | 117/132 |
| 3,353,992 | 11/1967 | Grenley et al. | 117/132 |
| 3,356,627 | 12/1967 | Scott | 260/29.6 TA |
| 3,549,566 | 12/1970 | Mesirov | 117/132 |

*Primary Examiner*—William D. Martin
*Assistant Examiner*—Sadie L. Childs

[57] ABSTRACT

There is disclosed an article and method for forming it in which an aqueous dispersion of a thermoplastic or thermosetting water-insoluble addition polymer composed of ethylenically unsaturated monomers, in which the polymeric particles are monodisperse and have a size in the range of about 0.5 to about 10 microns, and in which the composition has a minimum film-forming temperature of about 10° to about 200° C. The dispersion is applied to a substrate, such as an automobile body, the coating so obtained is dried at a temperature below the minimum film-forming temperature of the composition so that the particles do not coalesce but dry to a compact, uncracked powdery but loosely coherent layer, which layer is then heated to a temperature at which the particles coalesce to a continuous uncracked film.

17 Claims, No Drawings

ARTICLES AND METHOD FOR FORMING THEM USING HEATFUSIBLE COATINGS FROM AQUEOUS DISPERSIONS OF WATER-INSOLUBLE POLYMERS

BRIEF SUMMARY OF THE INVENTION

Disclosed is a composition and process which permits the application of heat-fusible coatings, from aqueous dispersions of water-insoluble polymers, to substrates such as automobile bodies, the applied coating being a clear or pigmented fusible thermoplastic or thermosetting coating, in which the coating fuses to a smooth, continuous, hard film without the use of substantial amounts of coalescents or solvents, if any. The coating is dried without coalescing or fusing the individual dispersed particles prior to the substantially complete drying of the uncoalesced coating. After drying, the uncoalesced coating may be compared with a powder coating on a substrate applied by means of dispersing the powder in a gaseous fluid such as air and placing an opposite charge on the powder and on the substrate so that the powder is attracted to the substrate. In the method disclosed in the present application, the utilization of powders (which are expensive to manufacture and hazardous both from the standpoint of possible explosions and as to respiratory problems in the particle size utilized, as well as the expensive conversion to sophisticated equipment not presently on hand) is avoided. In particular, the disclosure provides a method of coating coated or uncoated substrates wherein the newly applied coating is fused by heat and in which a non-polluting aqueous system is utilized to coat the substrate, comprising the steps of applying to a surface of the substrate an aqueous dispersion of a thermoplastic or thermosetting water-insoluble addition polymer composed of one or more of the following vinyl monomers: an alkyl methacrylate having from 1 to 20 carbon atoms in the alkyl group, alkyl acrylates having from 1 to 20 carbon atoms in the alcohol group, monovinyl aromatic compounds, esters of vinyl alcohol, vinyl halides, vinyl nitriles, vinyl ethers, and optionally having a maximum of 10 percent of olefinically unsaturated monomers having hydroxyl, carboxyl, amido, amino, or epoxy groups. The polymeric particles in said dispersion must have a uniform particle size of a large diameter, compared to normal emulsion polymerized dispersions, of from 0.5 micron to about 10 microns, preferably 0.8 to 2 microns, the thickness of the fused coating being between 0.1 mil and 10 mils, the MFT of the composition being between about 10°C. and about 200°C. (MFT is an abbreviation for minimum film forming temperature, described hereinafter), the weight average molecular weight of the polymer of said dispersed particles being between about 40,000 and about 400,000, drying said coating under conditions such that the water evaporates substantially completely at a temperature below the MFT of the coating so that the particles do not coalesce to a continuous film and the coating dries to a compact uncracked powdery but loosely coherent layer, followed by heating the coating to a temperature at which the particles coalesce to a continuous uncracked film. It is essential that the particles be extraordinarily large as compared with the size obtained with the usual emulsion polymerization systems using redox or thermal methods involving free radical initiation. Not only must the particles, whether obtained by emulsion polymerization, suspension polymerization, atomization, sub-division of larger particles, etc., be of the specified large size, they must also be of uniform particle size. These particles may occur in emulsion or suspension polymerization procedures now used but commonly occur in admixture with varying amounts of smaller and/or larger particle sizes. If methods of polymerization are not used which provide the necessary uniformity of particle size, known fractionation procedures are used to sequester the necessary narrow size range.

DETAILED DESCRIPTION

This invention relates to an aqueous composition of a water-insoluble addition polymer dispersed in an aqueous liquid, the dispersed particles being of a uniform large size as compared with conventional emulsion polymers, and being of monomers which give hard polymers when homopolymerized to give high molecular weight polymers, the polymeric particles in the instant case most desirably having a relatively low molecular weight compared to standard emulsion polymers that have molecular weights in the million and greater range. Desirably the rheological properties of the aqueous dispersion are improved by the addition of thickeners. Normally, the aqueous medium is low in ionic materials, particularly inorganic ions; this may be achieved by various means including deionization of the latex by passing the same through a mixed bed of cation and anion exchange resins. Alternatively, the deposited compact uncracked powder film can be water rinsed to remove these impurities and then redried before heat fusion to a continuous film. Paints according to the invention are contrasted with ordinary latex paints which must coalesce at the use temperature or below, as by using plasticizers or coalescents and by utilizing soft polymers having a low second order transition temperature. According to the present invention, in addition to the large particle size, the polymers have a high second order transition temperature, a relatively low molecular weight, and the coating composition has a high enough minimum film forming temperature (MFT) so that the water in the coating will evaporate below the MFT.

Latex polymers have a number of virtues that recommend them for use in industrial baking finishes. Of major current interest is the aqueous medium in which they are supplied, permitting them to be applied with existing liquid coating application equipment and yet be exempted from anti-solvent air pollution legislation now in effect or soon to be enacted. Furthermore, the latex polymerization process is able to accomodate most of the kinds of compositions that are being used in current solvent based coatings; and indeed, it is able to accomodate these compositions at more desirable higher solids and higher molecular weight, due to the dispersed form of the polymers vs. homogeneously dissolved solvent coatings.

Despite these attributes, as suggested above, latex polymers have found very limited use in industrial coatings to date because of a number of unsolved application problems. In approximate order of decreasing importance, the problems have included blistering in baking ovens, very long flash-off times, low gloss, mudcracking, water sensitivity, sagging, foaming, cratering, and crawling.

Under pressure of increasingly restrictive air pollution legislation, many users of solvent based coatings are considering alterative means of coating which will minimize or eliminate the pollution problems. One such system that is well advanced is the non-aqueous dispersion (NAD) system in which the binder is dispersed in a liquid, organic non-solvent that has low level pollution. In particular, aliphatic non-solvents that conform to California's Rule 66 are favored as the carrier for the paint solids. Despite the positive features of this approach, there are still a number of problems and these include need for solvent, even though it is of a less photochemically active type, unavailability of auxiliaries needed to make good paints (polymerization surfactants to control the particle size of the binder, pigment dispersants, pigment wetting agents, thickeners, flow control agents, and so on); and, perhaps most damaging, a number of desirable compositions cannot be made because they possess too high a level of hydrophobic monomers which cause swelling and stability problems with the NAD's.

More recently, much attention has been devoted to the development of powder coatings by fluidized bed or electrostatic spraying techniques. This method completely eliminates solvents, except for possible volatiles that may split out as a result of crosslinking reactions in the thermosetting types. The method has been used successfully with certain compositions that happen to be manufactured as small particle size powders and which are of low molecular weight, such that they offer low melt viscosity and minimal compounding problems during pigmentation and powder fluxing steps. Typical examples are epoxy resins, vinyl chloride resins, and certain nylons. Many problems are presented, however, in the greater context of a general method of metal finishing. For example, it is very expensive to process materials as melts through extruders and then to pulverize them to very small particle size. Even if one could tolerate the expense of these steps, one cannot pulverize too finely because dusting problems will be encountered that will be greater hazards to the workers than the previously used solvents, both from a flammability point of view and a toxicity point of view. On the other hand, if the powder is too coarse, it becomes difficult to produce films of reasonable thinness. Other negative features of the powder coating process include difficulty in applying powders to the substrate in a uniform way and difficulty in fluxing powders to a smooth film. This is a problem with the compositions mentioned and it becomes an even greater handicap with other brittle type solids, such as acrylics and styrenated resins. Powder coating is viewed as a very expensive technique of limited applicability which can solve the pollution problem for specialty coaters who can tolerate the expense and material limitations.

For some years, 100 percent solids coatings of a fluid type have been under investigation and they are usually of the monomer/polymer syrup type in which the "solvent" is a polymerizable vinyl monomer or related adduct. In principle, these coatings offer the lowest raw material cost since a major fraction of the total is unprocessed monomer, available at low cost, and the remainder is polymer of reasonable cost. In the ideal case, no volatiles are present, as is the case in solvent coatings, NAD's, or even water. These volatiles cost money either by way of their inherent cost or via their handling and shipping costs; yet they do not remain in the final coating and the cost per unit coating deposited is thereby increased. Despite their highly desirable raw material costs and their theoretical 100 percent non-polluting solids, those syrups have not found broad commercial utility due to the volatility of the monomers (which, incidentally, are very bad air pollutants) and the inability to cure them reasonably due to air inhibition. To overcome the volatility and air inhibition problems, a very rapid method of polymerization in nitrogen or other inert atmosphere has been worked out. This is the high energy radiation curing method of coated sheets or coil that are passed under the energy beam in an inert atmosphere. However, this system has serious limitations with regard to the shapes of coated objects that can be cured (only flat sheets or slightly curved objects) and, the high expense, added to dangers of high-energy radiation equipment. A final word about the system is that mechanical properties tend to be poor because free radical polymerization kinetics demands that high rates of polymerization through high rates of initiation produces low molecular weight. Even if this low molecular weight is improved by using increasing amounts of divinyl or polyvinyl monomers, the coatings still tend to be brittle because multiple points of crosslinking also lead to brittleness.

Another medium used in attempts to overcome the pollution problems is the water based paint type. Latex paints have been used for many years now in the trade sales context, i.e., paints applied on site at ambient conditions by the consumer, using unsophisticated application methods, such as brushing or roller coating. When these systems have been tried for industrial finishing, they have been found deficient in hardness, mar resistance, gloss, clarity of image, chemical resistance properties and exterior durability properties. Moreover, during the application and heat curing stages of coating, problems of cratering, crawling, foaming, sagging, slow drying, and blistering have been encountered. In the late 50's and into the 1960's, many approaches to water-soluble or "water solubilized" binders have been investigated. These have tended to improve on the gloss, clarity of image, chemical and exterior exposure resistance properties. But the application and heat curing problems (sagging, blistering, cratering, crawling) have been much worse. Hence, very little water-based material has found its way into the industrial finishing area and in particular, the industrial baking finishes.

THE INVENTION

Certain critical and essential features have been found to overcome the disadvantages of the prior art in cases where it is desired to form a hard glossy coating of conventional thickness from an aqueous latex, and the parameters of the critical features are discussed hereinbelow.

POLYMER PARTICLE SIZE AND UNIFORMITY

As has been suggested above, conventional emulsion polymers have diverse particle sizes, or even when the particle size is relatively uniform, the product inherently has a particle size in the neighborhood of 0.1 micron. The composition of the invention utilizes particles having a large and uniform particle size, said uniformity being designated by means of criteria set forth below.

The dispersion may be of unimodal particle size or of bimodal particle size. In each case, there is a strict requirement that the large particles ($0.5-10\mu$, preferably $0.8-2\mu$) be of uniform particle size. This uniformity is conveniently expressed by the ratio of the weight or volume average diameter ($d_4$) to the number average diameter ($d_1$). Herein this is called the heterogeneity index. This ratio for the large mode must be no larger than 1.7 and is preferably less than 1.3. Where the latex is a bimodal blend of large and smaller particles, the relative particle sizes and amounts are critical. If the relative size of the small mode to the large mode (ratio of $d_4$ diameters) is >0.6, the particles are essentially unimodal with the heterogeneity index being <1.7 with any ratio being useful, but if the relative size is <0.6 then the small mode must be <30 percent by volume of the two, and satisfactory coatings according to the invention are attainable. As the particle sizes of the two modes or populations approach one another, more of the small mode can be tolerated.

The weight or volume average particle diameter is defined herein as:

$$d_4 = \frac{\epsilon\, n_i d_i^4}{\epsilon\, n_i d_i^3}$$

where $n_i$ is the number of particles of diameter $d_i$. The number average particle diameter is defined herein as:

$$d_1 = \frac{\epsilon\, n_i d_i}{\epsilon\, n_i}$$

Both of these averages and the related heterogeneity index for a given latex are obtained by standard methods applicable to dispersions of particles in liquids. Note *Particle Size*, R. D. Caddle, Reinhold, 1965, Chapter 1; *Particle Size: Measurement, Interpretation and Application*, R. R. Irani and C. F. Callis, Wiley, Chapters 1–4; and for determinations by electron microscopy, S. H. Maron et al., *Journal of Applied Physics*, Volume 23, page 900, 1952.

As an example, taking a blend of two particles having diameter of 1 micron with 4 particles having diameter of 2 microns, $$d_4 = \frac{2(1)^4 + 4(2)^4}{2(1)^3 + 4(2)^3} = \frac{66}{34} = 1.9412 \text{ microns}$$

and $$d_1 = \frac{2(1) + 4(2)}{2 + 4} = \frac{10}{6} = 1.6667 \text{ microns}$$

with the heterogeneity index $= d_4/d_1 = 1.165$. Given the uniformity as defined above, the polymeric particle size useful in accordance with the present invention, and the particles most preferably being spherical, cause such shape as to provide good packing without mudcracking and large interstices between particles to permit evaporation of water. The particle size range of the invention is from $0.5\mu$ to $10\mu$, more preferably from about $0.8\mu$ to about $2\mu$. This particle size is not intended to exclude the presence of water-soluble polymers having a relatively low molecular weight, nor to exclude the presence of colloids.

MINIMUM FILM-FORMING TEMPERATURE (MFT) OF THE COATING COMPOSITION

It is essential that the minimum film-forming temperature of the coating composition be between about 10° C. and 200° C., more preferably between 20° and 100° C.

POLYMER COMPOSITION

The monomer makeup of the polymers useful in the invention is not novel. This is not to say that certain criteria in selecting monomer makeup must not be observed.

The polymer composition has a second order transition temperature referred to herein as "Tg" and sometimes defined as the glass transition temperature, which is a temperature at which a homopolymer of a given monomer of molecular weight in the range of 500 to 1,000,000 or more would change from a glassy state to a rubbery state as the temperature is raised, must be such that the coating composition gives the required MFT. In addition to Tg, other well-known influences on MFT include the additives present including plasticizers or coalescents, if any, the plasticizing effect of water, which is in turn dependent to a degree upon the composition of the monomers entering into the polymer, the particle size and molecular weight of the polymer, including their hydrophilicity, and so forth. Of course, the desired hardness of the final film depends on the monomers, commonly referred to as "hard" and "soft" monomers, used in the polymer, and their ratios.

FUNCTIONAL MONOMERS AND AMOUNTS

Minimal amounts of functional monomers having hydroxyl, carboxyl, amino, amido, or epoxy groups and the like, when used, are beneficial in promoting adhesion and in some cases providing thermosettability. The maximum proportion of such monomers based on total monomers is 10 percent, preferably a maximum of about 5 percent. Excessive amounts of some of these monomers contribute to hydrophilicity of the polymer; if the polymer is excessively hydrophilic, coatings therefrom may have undesirable properties.

PACKING OF POLYMERIC PARTICLES IN UNCOALESCED COATING

The particles must "pack" when wet and in drying; i.e., there must be an essentially particle-to-particle contact, as contrasted with a loose, powdery coating, a coating in which individual flocs of a number of particles are formed, and particularly as contrasted with a mudcracked coating which occurs with a wide distribution of particle sizes, and with particles of small size. That is, with a latex in which the bulk of the particles are in the 0.1 micron area or in a latex having a substantial proportion such as 40 percent of particles in the neighborhood of 0.1 micron and a larger proportion of particles of 0.5 to 3.0 microns, even when polymer composition and coating MFT are within the useful areas of the invention, satisfactory coatings are not obtained.

Regarding packing of the polymers, an illustrative analogy appears as follows: consider a bed or layer of stacked glass marbles of, for example, ½ inch in diameter and with substantial freedom from small size particles which would fill the interstices between the marbles. An undesirable situation, to pursue this analogy, would be a blend of such marbles with a large amount of "BB's"--spherical pellets 0.16 inch or so in diameter. Also, the polymeric particles must be free of flocculated agglomerates. If agglomerated particles (dumbbells, chains, etc.) appear or the particles dry to a loose powder without substantial particle-to-particle contact (packing), mudcracking occurs, even when the film has the required minimum film-forming temperature and the polymer is of the same hardness.

MOLECULAR WEIGHT

Emulsion polymerizations inherently give a high molecular weight. As is known, this can be lowered by the use of chain regulators such as bromotrichloromethane. For best results, the molecular weight of the polymer in the present invention must be between 40,000 to 400,000 weight average molecular weight.

MUDCRACKING, FLOCCULATION, AND BLISTERING

While the invention is not limited to the following hypotheses and speculations, evidence suggests that certain factors contribute to undesirable results of drying latex coatings sometimes encountered, including mudcracking, blistering, and the formation of flocs.

Blistering is believed to be caused in some cases by the surface of the film reaching the MFT and coalescing before the water in the film is entirely evaporated. Thus, in a film of low MFT relative to the temperature of drying (usually room temperature of about 20° C. to 25° C.), sufficient coalescing of surface particles may occur to block the interstices between the large particles, preventing the free passage of water vapor. The trapped water then expands and causes blistering during the high temperature fusion step.

An excessive amount of small particles may cause premature fusion or agglomeration or flocculation of particles before they have a chance to pack, or they may interfere with the packing of the uniform large particles, thus causing cracking of the film.

DETAILED DESCRIPTION

Important properties of the copolymer are its toughness and flexibility and the minimum film-forming temperature (MFT) of the formulated coating composition, both dependent in large part upon the influence of its monomer composition. The glass transition temperature (Tg) of the copolymer depends upon the selection of monomers and proportions thereof because of their influence on the Tg. "Tg" is a conventional criterion of polymer hardness and is described by Flory, "Principles of Polymer Chemistry," pp. 56 and 57, (1953), Cornell University Press. While actual measurement of the Tg of copolymers may be made, it may be calculated as described by Fox, Bull. Am. Physics Soc. 1, 3, p. 123 (1956). Examples of the Tg of high molecular weight homopolymers and the inherent Tg thereof which permits such calculations are as follows:

| Homopolymer of | Tg |
| --- | --- |
| n-octyl acrylate | −80° C. |
| n-decyl methacrylate | −60° C. |
| 2-ethylhexyl acrylate | −70° C. |
| octyl methacrylate | −20° C. |
| n-tetradecyl methacrylate | −9° C. |
| methyl acrylate | 9° C. |

-Continued

| Homopolymer of | Tg |
| --- | --- |
| n-tetradecyl acrylate | 20° C. |
| methyl methacrylate | 105° C. |
| acrylic acid | 106° C. |

These or other monomers are blended to give the desired Tg of the copolymer. As is known, for a given number of carbon atoms in the alcohol moiety, the extent and type of branching markedly influences the Tg, the straight chain products giving the lower Tg.

One of the monomers utilized to prepare the water-insoluble addition copolymer is a flexibilizing or "soft" monomer which may be represented by the following formula:

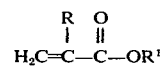

wherein R is H or alkyl having 1 to 4 carbon atoms and R¹ is the straight chain or branched chain radical of a primary or secondary alkanol alkoxyalkanol or alkylthiaalkanol, the alkanol having from 2 to about 14 carbon atoms, the chain length depending upon the identity of R, examples being ethyl, methylpropyl, n-butyl, 2-ethylhexyl, heptyl, hexyl, octyl, propyl, 2-methylbutyl, 1-methylbutyl, butoxybutyl, 2-methylpentyl, methoxymethyl, ethoxyethyl, cyclohexyl, n-hexyl, isobutyl, ethylthiaethyl, methylthiaethyl, ethylthiapropyl, n-cotyl, 6-methylnonyl, decyl, dodecyl, and the like. When R is alkyl and R¹ is alkyl, R¹ should have from about 6 to about 14 carbon atoms and when R is H and R¹ is alkyl, R¹ should have from 2 to about 12 carbon atoms, in order to qualify as a soft monomer.

In addition to the flexibilizing monomer, the other essential monomers are the "toughening" or "hard" monomers, discussed in greater detail below and including, for example, monovinyl, aromatic monomers, certain acrylic acid and/or methacrylic acid esters, vinyl halides, vinyl nitriles, and, if used, the monomers having hydroxyl, carboxyl, amino, amido, epoxy, or other functionality described below. The hardness or softness of the acid and other functional monomers is not critical because of the small amounts used. Styrene and vinyltoluene are examples of the monovinyl aromatics.

The unsaturated carboxylic acid, the preferred functional monomer, may be a simple monocarboxylic acid, or may be a half ester or half amide of an α,β-unsaturated dicarboxylic acid, and salts thereof with a volatile base such as ammonia, or with a volatile water-soluble amine such as dimethylamine, triethylamine, triethanolamine, morpholine, N-methyl morpholine, picoline, and the like. Examples of copolymerizable ethylenically unsaturated monocarboxylic or polycarboxylic acids are sorbic, cinnamic, vinyl furoic, α-chlorosorbic, p-vinylbenzoic, acrylic, methacrylic, maleic, fumaric, aconitic, atropic, crotonic, and itaconic acid, or mixtures thereof, with itaconic acid and the α,β-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate, and butyl acid maleate. Such partial esters and partial amides are considered to be "α,β-unsaturated monocarboxylic acids," and the term as used herein includes such esters and amides.

In addition to or in place of the acids, amides such as acrylamide and methacrylamide, 2-sulfoethyl methacrylate, the materials disclosed in U.S. Pat. Nos. 3,446,777 to W. D. Emmons, 3,150,118 to D. H. Clemens, and 3,266,930 to W. D. Emmons and E. Hankins Owens, and various other functional, polar, or monomers having groups which remain reactive after the polymer is formed, for example, falling within the definitions of formulas II, III, IV, V, and VI, are also useful, as follows:

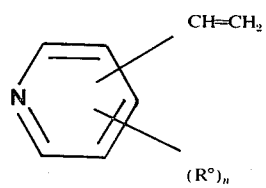

(II)

where R° is selected from the group consisting of H and alkyl groups having 1 to 4 carbon atoms, and n is an integer having a value of 1 to 4, $$CH_2=C(R)AYNR^1R^2 \quad (III)$$

where R is selected from the group consisting of H and $CH_3$,

A is selected from the group consisting of O, S,

Y is an alkylene group having 2 to 4 carbon atoms,
$R^1$ is selected from the group consisting of H and an alkyl group having 1 to 4 carbon atoms, and
$R^2$ is selected from the group consisting of H and an alkyl group having 1 to 4 carbon atoms,

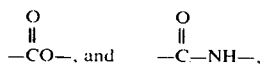

(IV)

where R is the same as above, and
Z is an alkylene group having 2 to 3 carbon atoms.

Examples of compounds of formula II include: 2-vinylpyridine; 4-vinylpyridine; 2-methyl-5-vinylpyridine; 5-methyl-2-vinylpyridine; 4-methyl-2-vinylpyridine; 2-ethyl-5vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine.

Examples of compounds of formula III include: dimethylaminoethyl acrylate and methacrylate; diethylaminoethyl acrylate and methacrylate; dimethylaminopropyl acrylate and methacrylate; diethylaminopropyl acrylate and methacrylate; dipropylaminoethyl acrylate and methacrylate; di-n-butylaminoethyl acrylate and methacrylate; di-sec-butylaminoethyl acrylate and methacrylate; di-t-butylaminoethyl acrylate and methyacrylate; dimethylaminoethyl vinyl ether and sulfide; diethylaminoethyl vinyl ether and sulfide; aminoethyl vinyl ether and sulfide; monomethylaminoethyl vinyl ether and sulfide; N,N-dimethylaminoethyl acrylamide and methacrylamide; N,N-diethylaminoethyl acrylamide and methacrylamide.

Examples of compounds of formula IV include: N-[β-(α-methacryloxyacetamido)ethyl]-N,N'-ethyleneurea; N-[β-(α-acryloxyacetamido)ethyl]-N,N'-ethyleneurea; N-[β-(α-acryloxyacetamido)ethyl]-N,N'-trimethyleneurea; N-[β-(α-methacryloxyacetamido)ethyl]-N,N'-trimethyleneurea.

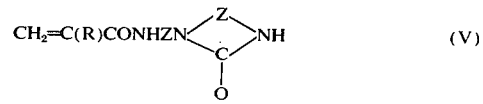

(V)

where R and Z are as defined above, of which an example is N-[β-(methacrylamido)ethyl]-N,N'-ethyleneurea.

(VI)

wherein
A is an alkylene group having 2 to 10 carbon atoms, preferably 2 to 3 carbon atoms, of which at least 2 extend in a chain between the adjoining oxygen atoms,
Y is selected from the group consisting of

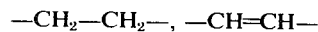

and ortho-phenylene, and
n is an integer having a value of 1 to 2.

Examples of compounds of formula VI include methacryloxyisopropyl acid maleate, methacryloxyethyl acid phthalate, methacryloxypropyl acid succinate, methacryloxydecyl acid succinate, and metharyloxyoctyl acid phthalate.

As noted above, in addition to the importance of Tg, the coating composition of the invention has a critical MFT. MFT is determined by the method described in Resin Review, Volume 16, No. 2 (1966), with the following modification. The MFT of a conventional latex is quite easy to identify visually on a thin film that is deposited on a temperature gradient bar. It is the temperature at which film cracking ceases and the film becomes continuous and clear. However, with the heat-fusible latices of this invention, deposited films are relatively free of cracking over the entire temperature range. Visually, the heat-fusible latices display a more gradual transition from opaque film to translucent film to clear-film as one proceeds toward the high temperature end of a temperature gradient bar. Consequently, the visual observations are augmented by scraping at the deposited film with a sharp instrument, such as the edge of a metal spatula, to determine the temperature at which the deposited film achieves good strength and integrity. This allows a more definite identification of the temperature at which there is a transition from a translucent film to a clear, continuous film, that is, the MFT as defined for heat-fusible coating compositions. This is influenced not only by the Tg of the addition copolymer, but by polymer composition and other ingredients such as plasticizers or coalescing agents, if used, and their amounts.

While the preferred polymers are thermoplastic, crosslinkable or thermosetting polymers, those subject to latent crosslinking are also useful.

There are essentially two types of latent crosslinking which can be used. These are (1) crosslinking subsequent to polymerization by including monomers in the polymer recipe which have functional groups capable of crosslinking by various mechanisms including self-crosslinking, or mutual crosslinking by different functional groups, both in the polymer chains, and (2) latent crosslinking by means of an external separately added chemical compound. Combinations can be used.

Where addition polymers are involved, monomers which are suitable for latent crosslinking include certain acrylics having crosslinkable functionality exemplified below.

Examples of the crosslinking reactions which are possible using heat, aging, and/or catalysis are:

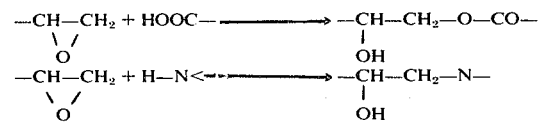

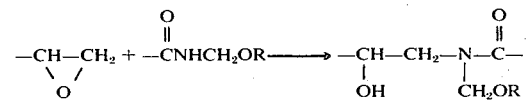

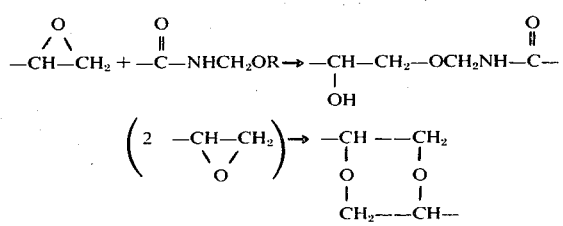

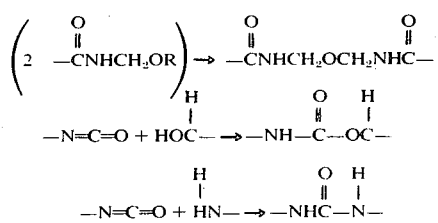

In the above, R is H or CH$_3$. Addition polymerizable unsaturated monomers containing such groups are well known in the art, examples being isocyanates such as isocyantoethyl methacrylate, epoxy compounds such as glycidyl methacrylate, aminoalkyl compounds such as methylaminoethyl methacrylate, and t-butylaminoethyl methacrylate, amides such as methacrylamide, guanamines such as 4-pentenoguanamine, hydroxyalkyl esters such as hydroxypropyl methacrylate and hydroxyethyl methacrylate, nitriles such as methacrylonitrile, N-alkoxyalkyl amides such as methoxymethyl methacrylamide, hydroxyalkyl amides such as N-methylol methacrylamide, the analogs of the above methacrylic acid derivatives with other unsaturated acids such as acrylic acid and itaconic acid, such acids themselves, dicarboxylic acids such as maleic acid and half esters and half amides thereof, vinyl ethers of glycols such as ethylene glycol, and so forth.

The crosslinkable addition polymerizable unsaturated monomers have reactive polar groups selected from those including

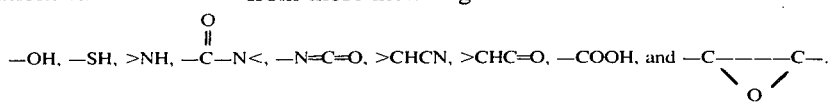

Such groups may be included as are mutually or self-crosslinkable, or separate crosslinking compounds such as a triazine-formaldehyde resin may be added, as is well known.

Of course, water sensitive materials such as isocyanates should not be used in aqueous systems unless they are blocked by groups such as phenol groups which protect the isocyanate groups until subsequent heating or the use of other reaction mechanisms such as the use of a calcium, zinc, or tin compound catalyst conventional in the art.

The separate added crosslinker, when used, is useful with or without the use of mutual crosslinking groups and self-crosslinking groups. Among the external crosslinking methods or compounds is the use of organic peroxides such as benzoyl peroxide; the use of epoxy resins such as that obtained from bis-phenol A and epichlorohydrin; esterification, by means of dicarboxylic acids reacting with hydroxyl groups in the polymers, or by reacting diols or polyols such as neopentyl glycol, trimethylol propane, trimethylol ethane, or ethylene glycol with carboxyl groups in the polymer; use of aminoplasts such as melamine formaldehyde, urea formaldehyde, or butylated melamine formaldehyde; diamines and polyamines such as hexamethylene diamine, ethylene diamine, and the Versamids; polyisocyanates such as toluylene diisocyanate; compounds with mixed functionality such as ethanolamine, and other well-known external crosslinkers.

Other ethylenically unsaturated copolymerizable monomers present are the "hard" or toughening monomers. These may be represented by the formula:

wherein R is as above. R$^2$ is preferably alkyl and is methyl or alkyl having from about 13 to about 20 carbon atoms when R is H, and is alkyl of from 1 to about 5 carbon atoms or alkyl of from about 15 to about 20 carbon atoms when R is methyl. It can be seen from above that for alkyl acrylates and alkyl methacrylates the Tg at first decreases with an increased chain length of the alkyl group and then the Tg again increases; i.e., both hard and soft monomers are known to occur in each group of esters. Examples of these hard monomers and other hard monomers include: methyl acrylate, vinyl acetate, tetradecyl acrylate, pentadecyl acrylate, methyl methacrylate, ethyl methacrylate, t-butyl acrylate, styrene, vinyltoluene, butyl methacrylate, and pentadecyl methacrylate.

The coating compositions are useful as clear coatings or they may be pigmented with a variety of pigments as set forth hereinafter.

If it is desired to increase the viscosity of these coating compositions, they may be readily thickened with various thickeners such as the water-soluble gums. Thus, the ammonium or lower amine salts of polycarboxylic acids are suitable, and typical examples are ammonium polyacrylate, ammonium polymethacrylate, the salts of polyacrylic and polymethacrylic acids with mono-, di-, and trimethylamine, the salts of polyacrylic and polymethacrylic acids with mono-, di-, and triethylamine, and the ammonium and lower amine salts of the copolymers obtained by polymerizing styrene and maleic anhydride and methylvinyl ketone and maleic anhydride. Certain cellulose derivatives are also suitable such as methyl cellulose, ammonium carboxymethyl cellulose, and hydroxyethyl cellulose.

The preferred embodiments of this invention, particularly with combinations which give hard films after baking, omit or involve the use of only minor amounts of materials which are designated as "coalescents." These coalescents may cause fusion of the film during air-drying prior to baking, a result at odds with the goal of the present invention—to achieve drying of the coating below the MFT of the coating. These coalescents, when used, are present only to promote the flow of coating composition during the baking cycle, but are such as not to form a part of the finished coating. They are characterized by being low in water-solubility, good solvents for the polymer mixture, less volatile than water so that they remain in the film after the water has evaporated, sufficiently volatile that they are in large part removed from the film before the end of the baking cycle, and not susceptible to hydrolysis in aqueous media either at ambient or elevated temperatures. Typical examples are isophorone (3,5,5-trimethylcyclohexene-2-one-1), 2-ethylhexanol, diacetone alcohol, dimethyl formamide, caprolactam, alkyl ethers of ethylene glycol and propylene glycol, and tributyl phosphate which are used in the amounts of 0 to 20 parts by weight on 100 parts by weight (solids basis) of the addition polymer in the coating composition. Additive components in organic solvents which do not serve as coalescents may also be produced, an example being a dye solution.

The preferred polymer having a molecular weight of between about 40,000 and 400,000 and more preferably between about 80,000 and 250,000 is made by the emulsion copolymerization of the several monomers in the proper proportions. Conventional emulsion polymerization techniques are described in United States Pat. Nos. 2,754,280 and 2,795,564. The polymers useful in the present invention, if not purchased commercially, are made broadly in a conventional manner and must be made with careful attention to certain aspects of the prior art.

Among commercially available latex polymers or polymers in aqueous dispersion of the particle size and uniformity critical to the invention are those polystyrene latices developed by Dow Chemical Company, of the type discussed by Paul C. Hiemenz, in Part C of Journal of Polymer Science at page 253 (uniform particles of $0.6\mu$ and $3.4\mu$). J. N. Shaw, in the same issue, at page 237, discusses monodisperse latices of the $1.13\mu$ size. While these uniform particles have been designated for use in calibrating electron microscopes or other apparatus for analyzing particle sizes and size distributions, they are well adapted for use in the present invention, preferably being acrylic polymers or copolymers, however.

The prior art describes methods of obtaining monodisperse latices of polymers of olefinically unsaturated monomers of the particle size and uniformity needed for the present invention. See, for example, 74 C.A. 32740K, reporting an article by Y. S. Papir et al. in J. Paint Techn., Vol. 42, No. 550, page 571 (1970) and 73 C.A. 88298u, reporting an article by M. E. Woods et al. in J. Colloid Interface Sci., 34(1), pages 91–9 (1970). The ratios of combinations of certain anionic and nonionic emulsifiers is adjusted with monomer identity to achieve control of the size and size distribution, as described by these references. In some cases, in order to obtain the desired molecular weight, the amount of initiator is varied, the temperature is varied, or a chain regulator is used, such as the mercaptans, bromotrichloromethane, etc.

The acid monomer and many of the other functional or polar monomers may be soluble in water so that the dispersing agent serves to emulsify the other monomer or monomers. A polymerization initiator of the free-radical type, such as ammonium or potassium persulfate, may be used alone or in conjunction with an accelerator, such as potassium metabisulfite, or sodium thiosulfate. Organic peroxides, such as benzoyl peroxide and t-butyl hydroperoxide are also useful initiators, as are the azo catalysts such as azodiisobutyronitrile. The amount of initiator may be adjusted to control the intrinsic viscosity of the polymer. The temperature may be from room temperature to 60°C. or more.

Suitable dispersing agents useful in emulsion polymerization include anionic types such as the sodium salts of the higher fatty acid sulfates, such as that of lauryl alcohol, the higher fatty acids salts, such as the oleates or stearates or morpholine, 2-pyrrolidone, triethanolamine or mixed ethanolamines, in combination with the nonionic types, such as ethylene oxide-modified alkyl phenols, of which tert-octyl phenol modified by 20 to 40 ethylene oxide units is representative, ethylene oxide-modified higher fatty alcohols such as lauryl alcohol, containing 20 to 50 ethylene oxide units, similarly modified long-chain mercaptans, fatty acids, amines, or the like. A monionic emulsifier, for stabilization, may be added after polymerization.

Copolymerization is best effected below about 80° C. A preferred range is 15° to 70°C., although slightly lower and somewhat higher temperatures are permissible. After most of the monomers have been converted to interpolymer, temperatures even higher than 80°C. may then be applied. During interpolymerization, the temperature can be controlled in part through the rate at which monomers are supplied and interpolymerized and/or through applied cooling.

The polymerization process can be carried out advantageously by starting with part of the monomers which are to be used and adding more monomer or monomers as polymerization proceeds. An advantage of gradual addition of monomers lies in reaching a high solids content with optimum control and with maximum uniformity of product. Additional catalyst may also be added as polymerization proceeds.

When pigments are employed, it is essential to employ a dispersant. While a wide variety of dispersants will satisfactorily disperse pigments, the effect of the dispersant on the properties of the final film must be considered. Many dispersing agents remain in the final film unchanged, thus seriously impairing the water-resistance of the film. Other dispersing agents will adversely affect the stabilities of the systems into which they are incorporated.

A preferred embodiment employs as dispersants the ammonium and lower amine salts of polymeric carboxylic acids. Thus, the ammonium and lower amine salts of polyacrylic and polymethacrylic acids and similar salts of the polymer acid obtained by copolymerizing methyl vinyl ether with maleic anhydride are suitable, as is the ammonium half amide salt or the diammonium salt of a diisobutylene-maleic anhydride copolymer having a number average molecular weight of from about 2,000 to about 4,000. The amount of dispersant employed will vary depending on the amount and nature of the pigments used and the amount and nature of the composition employed as binder. Generally, however, from about 0.3 to about 3.5 parts by weight (solids basis) per 100 parts by weight of pigment, will prove to be effective for dispersing the pigment.

The coating compositions of the present invention may, as set forth hereinbefore, be employed as clears, i.e., non-pigmented coatings, or as pigmented coatings. If pigmented, the ratio of pigments to coating solids may be varied widely, depending on the pigment employed and the specific application involved. Thus, the ratio of pigment to coating solids may vary from 1 to 20 to 20 to 1. The clears are particularly useful as "overcoats," i.e., the so-called overprint coatings which are used to protect decorative undercoats without detracting from the decorative effect. Because the clear coatings of the present invention exhibit good clarity, high gloss, excellent solvent and water-resistance, and high adhesion to a variety of surfaces, they are admirably suited for use as topcoats.

The coating compositions of this invention can be applied to a variety of substrates, the only restriction being the ability of the substrate to withstand the baking cycle which is essential in the processing of said coating compositions. Metals are particularly suitable, whether primecoated or unprimed. Thus, iron, steel, chrome-plated steel, tin-plated steel, aluminum, copper, bronze, or brass surfaces, particularly in sheet or coil form with thicknesses of 0.05 to 0.02 inch, prove to be excellent as substrates for the coating compositions of the present invention. Ceramic surfaces such as glass, which can thus be made shatterproof, and, in some instances, wood surfaces, are also suitable as substrates.

A wide variety of pigments can be employed with the coating compositions of the present invention. The pigments employed, however, must be reasonably stable and non-reactive under alkaline conditions, i.e., a pH from about 8 to about 11, to give package stability of days to weeks or more. Typical pigments which are suitable include titanium dioxide, iron oxide, calcium carbonate, aluminum flake, stainless steel flakes, barytes and numerous types of clays.

The coating compositions can be applied by suitable means or equipment, such as with spray guns, with brushes, or rollers, or by dipping, and by roller coating, i.e., a roller applies the coating to the substrate while rotating in a pool of the coating composition. One embodiment involves allowing the coated substrate to air-dry at room or slightly elevated temperature. This is not always necessary, however, because in some cases the present invention provides products which do not blister when a coated product is put in the oven while wet. The air-drying cycle, if used, should be continued until the uncoalesced film, either clear or pigmented, is substantially free from water. The baking or curing operation volatilizes all the volatile material in the film including any remaining water, traces of monomer, and coalescents, if present. Depending on the specific composition being used, the baking temperature may vary from 140° F. to about 400° F. or higher. Baking times will vary from about 45 minutes to about 30 seconds, with cured film thickness being 0.1-10 mils.

The following examples illustrate the practice of the invention:

EXAMPLE 1

An aqueous latex copolymer of the prior art having a weight average molecular weight of about one million is prepared having composition by weight of the monomers: 66 percent ethyl acrylate, 32.7 percent methyl methacrylate, and 1.3 percent methacrylic acid. The latex is characterized by the following parameters:

| | |
|---|---|
| nonvolatile | 46% by weight |
| mean particle diameter ($d_1$) | 0.10 microns |
| heterogeneity index | <1.1 (unimodal) |
| minimum film-forming temperature | 9° C. |
| pH (by adjustment with aqua ammonia) | 9.5 |

The latex is applied by drawdown blades to aluminum test panels such as to yield films of 0.5, 1.3, and 3 mils respectively when dry. One set of films at each thickness is allowed to dry at ambient temperature (25° C.) for several hours and is then placed in a baking oven at 350° F. for fifteen minutes. A second set of films is placed in a baking oven at 350° F. for fifteen minutes. A second set of films is placed immediately in the baking oven, i.e., while still wet. The following are observed:

| Film Thickness (mils) | Baked Wet | Ambient Dried | Ambient Dried, then Baked |
|---|---|---|---|
| 0.5 | Smooth, continuous, glossy film | Smooth, continuous glossy film | Smooth, continuous glossy film |
| 1.3 glossy, | Smooth, blisters (as above) but heavily mud-cracked, no blisters | No mudcracking, no blisters (as above) | No mudcracking, no |
| 3 | Severely mud-cracked, severely blistered | Moderate mudcracking, no blisters | Moderate mudcracking, no blisters |

EXAMPLE 2

An aqueous latex copolymer of the prior art having a weight average molecular weight of about 600,000 to 800,000 is prepared of monomer composition, by weight: 54.5 percent butyl acrylate, 45 percent methyl methacrylate, and 0.5 percent methacrylic acid. The latex has the following properties:

| | |
|---|---|
| nonvolatile | 46 percent |
| mean particle diameter ($d_1$) | 0.09 micron |
| heterogeneity index | <1.1 (unimodal) |
| minimum film-forming temperature | 9° C. |
| pH (by adjustment with aqua ammonia) | 9.5 |

The latex is applied to test panels and dried under the various conditions identically as described in Example 1, and with virtually identical findings.

EXAMPLE 3

An aqueous latex copolymer of the prior art having a weight average molecular weight of about one million to two million is prepared having monomer composition, by weight: 40 percent butyl acrylate, 59.5 percent methyl methacrylate, and 0.5 percent methacrylic acid. The latex has the following properties:

| | |
|---|---|
| nonvolatile | 50 percent |
| mean particle diameter ($d_1$) | 0.12 micron |
| heterogeneity index | <1.1 (unimodal) |
| minimum film-forming temperature | 45° C. |
| pH (by adjustment with aqua ammonia) | 9.5 |

The latex is applied to test panels and dried under the various conditions identically as described in Example 1. The following are observed:

| Film Thickness (mils) | Baked Wet | Ambient Dried | Ambient Dried, then Baked |
|---|---|---|---|
| 0.5 | Smooth, glossy, largely continuous film-occasional star-shaped cracks. Not blistered. | Pervasive network of fine cracks. Pieces of film are translucent white and readily flake from the substrate. | Irrelevant |
| 1.3 | Smooth, glossy, but moderate-heavy mudcracking. Not blistered. | Same as above. | |
| 3 | Heavily mud-cracked and severely blistered. | Same as above. | |

EXAMPLE 4

An aqueous latex copolymer is prepared having monomer composition, by weight: 20 percent butyl acrylate, 79.5 percent methyl methacrylate, and 0.5 percent methacrylic acid. The latex has the following properties:

| | |
|---|---|
| nonvolatile | 49 percent |
| mean particle diameter ($d_1$) | 0.13 micron |
| heterogeneity index | <1.1 (unimodal) |
| minimum film-forming temperature | >60° C. |
| pH (by adjustment with aqua ammonia) | 9.5 |

The latex is applied to test panels to yield films of approximately 0.5 mil thickness when dry. Drying at 25°C. results in a pervasive network of fine cracks in the film. The individual pieces are translucent white in appearance and readily flake from the substrate. Introduction of the wet film directly into the baking oven (350°F. for fifteen minutes) also yielded a film having a network of fine cracks, but here the individual segments are clear and adherent. Nevertheless, the film is not a useful coating.

In this and the following examples, the copolymer has a molecular weight of about 100,000 to 150,000 weight average.

EXAMPLE 5

An aqueous latex copolymer is prepared having the same monomeric composition as that in Example 4, but of substantially greater particle size. The latex has the following properties:

| | |
|---|---|
| nonvolatile | 60.3 percent |
| mean particle diameter ($d_1$) | 1.5 microns |
| heterogeneity index | <1.1 (unimodal) |
| minimum film-forming temperature | >60° C. |
| pH (by adjustment with aqua ammonia) | 9.6 |

The latex is applied to test panels and dried under the various conditions and film thickness, as described in Example 1, with the following results. Films dried by introducing the wet coatings into the baking oven (350° F. for 15 minutes) are smooth, glossy and free of cracks and blisters for film thicknesses ranging up to 3 mils. The latex dries at ambient temperature (25° C.) to smooth, uncracked, opaque films which are adherent to the substrate. The films are nevertheless uncoalesced and may be scraped from the substrate. Baking of the air dried films results in fusion of the particles to smooth, glossy, clear films, free of cracks and blisters for thicknesses up to 3 mils.

EXAMPLE 6

An aqueous latex copolymer is prepared having the same monomeric composition as the latex of Example 2, but of substantially greater particle size. The latex has the following properties:

| | |
|---|---|
| nonvolatile | 50 percent |
| mean particle diameter ($d_1$) | 1.5 microns |
| heterogeneity index | <1.1 (unimodal) |
| minimum film-forming temperature | 16° C. |
| pH (by adjustment with aqua ammonia) | 9.5 |

The latex is applied to test panels and dried under the various conditions and film thicknesses as described in Example 1, with the following results. Films dried by introducing the wet castings into the baking oven (350° F. for 15 minutes) are smooth, glossy and free of cracks and blisters for film thicknesses ranging up to at least 3 mils. The latex dries at 25° C. to smooth and crack-free films which are adherent to the substrate, and have good cohesion. Backing improves the gloss of the films and they remain smooth and free of cracks and blisters.

EXAMPLE 7

Aqueous latex copolymers of identical monomeric compositions and of equally narrow particle size distribution, but of varying mean particle diameter are prepared. The monomeric composition by weight is: 30 percent butyl acrylate, 68 percent methyl methacrylate and 2 percent methacrylic acid. All have a nonvolatile content of 50 percent, a heterogeneity index of <1.1, a pH of 9.5, and minimum film-forming temperatures of 50° to 55° C.

The latices, applied to test panels to yield a film thickness of approximately 1.5 mils when dry, are allowed to dry at 25° C. and are rated for visual appearance with the following findings:

| Mean Particle Diameter ($d_4$) (microns) | Film Appearance |
| --- | --- |
| 0.25 | badly cracked film |
| 0.50 | few cracks |
| 0.80 | no cracking, coherent smooth film, but not coalesced |

EXAMPLE 8

Two latex copolymers differing substantially in mean particle diameter, but of equal monomeric composition are prepared. The monomeric composition is 20 percent butyl acrylate, 78 percent methyl methacrylate, and 2 percent methacrylic acid. Both latices have nonvolatile content of 50 percent, a minimum film temperature of >60° C., and a pH about 9.5 by adjustment with aqua ammonia. One latex has an average particle diameter ($d_4$) of 1.0 micron and heterogeneity index of less than 1.1. The second latex has a means particle diameter ($d_4$) of 0.1 micron and heterogeneity index less than 1.1. The two latices are blended in various ratios and cast on test panels to yield two mil thick films when dry. The coatings are allowed to dry at 25° C. and are then examined visually, with the following findings:

| Weight Percent 1.0 Micron Latex | Weight Percent 0.1 Micron Latex | Film Appearance |
| --- | --- | --- |
| 100.0 | 0.0 | Coherent smooth film (but uncoalesced) |
| 74.5 | 25.5 | Same as above |
| 68.0 | 32.0 | A few cracks |
| 58.3 | 41.7 | Substantial cracking |
| 0.0 | 100.0 | Severe cracking and flaking |

EXAMPLE 9

Procedures identical to those described in Example 8 are conducted, except that a latex copolymer of 0.25 micron mean particle diameter ($d_4$) is used in place of the 0.1 micron latex. The following are observed:

| Weight Percent 1.0 Micron Latex | Weight Percent 0.25 Micron Latex | Film Appearance |
| --- | --- | --- |
| 100.0 | 0.0 | Coherent smooth film (but uncoalesced) |
| 73.6 | 26.4 | Same as above |
| 66.3 | 34.7 | A few cracks |
| 58.5 | 41.5 | Substantial cracking |
| 0.0 | 100.0 | Severe cracking and flaking |

EXAMPLE 10

A white pigmented baking finish especially suited for coating metal objects is prepared from the latex copolymer described in Example 5, as follows:

A. A pigment dispersion is prepared by ball-milling the following ingredients for 16 hours.

| Ingredient | Parts by Weight |
| --- | --- |
| Pigment, rutile $TiO_2$ | 320.0 |
| Dispersing agent, 2-amino-2-methyl-1-propanol | 4.8 |
| Wetting agent, alkylaryl polyether | 1.2 |
| Antifoaming agent, tributyl phosphate | 1.6 |
| Thickening agent, ammonium salt of a methacrylic acid polymer (7.5% aqueous solution) | 21.3 |
| Water | 451.1 |

B. Pigment dispersion is blended with the latex copolymer described in Example 5.

| Ingredient | Parts by Weight |
| --- | --- |
| Pigment dispersion, A above | 100.0 |
| Latex copolymer, at 60.3 weight percent NV in water | 265.3 |
| Pigment/binder weight ratio = | 20/80 |
| Weight percent solids = | 54.75 |

The above paint is spray applied to phosphate treated cold rolled steel panels in various thicknesses up to approximately 3 mils when dry. One set of panels is allowed to dry for fifteen minutes at ambient temperature (25° C.) and is then placed in the baking oven (350° F./30 minutes). A second set of panels is placed in the baking oven immediately after spraying, while still very wet. Both sets of baked coatings are adherent, smooth and glossy, and free of cracks or blisters. Furthermore, the coatings (while wet) display good resistance to sagging on vertical surfaces during the coating-drying-baking cycles.

EXAMPLES 11 TO 15

While products having higher MFT's are preferred, the following latices, the polymers thereof having molecular weights of about 100,000 to 400,000, a heterogeneity index of below 1.5, and having MFT's below about 30° C., are also useful in the invention:

| | Composition | Number Average Diameter |
|---|---|---|
| 11. | 50 BA/25 S/20 AN/2.5 HEMA/2.5 MAA | 0.85μ |
| 12. | 40 BA/54 MMA/5 VT/1 MAA | 0.75μ |
| 13. | 60 EA/37.5 MMA/2.5 IA | 0.5μ |
| 14. | 70 EA/10 MAA/16 AN/1.5 MOA/2.5 IA | 0.6μ |
| 15. | 50 BA/49 MMA/1 MAA | 0.75μ |

As will be noted, all of these comprise EA or BA with MMA, S, or VT, with MAA or IA and in some cases AN and MOA or AN and HEMA. In the above, the abbreviations are as follows:

| Abbreviation | Monomer |
|---|---|
| BA | butyl acrylate |
| EA | ethyl acrylate |
| S | styrene |
| VT | vinyl toluene |
| AN | acrylonitrile |
| HEMA | hydroxyethyl methacrylate |
| MMA | methyl methacrylate |
| MAA | methacrylic acid |
| MOA | methyloacrylamide (as 50:50 MOA:acrylamide mixture, by weight) |
| IA | itaconic acid |

EXAMPLE 16

This example illustrates a suitable method for making the latices useful in accordance with the present invention.

In this example, by application of the general technique described in the references:

1. M. E. Woods et al., J. Paint Technology, 40, No. 527, 541 (1968);
2. J. S. Dodge et al., ibid., 42, No. 541, 71 (1970);
3. Y. S. Papir et al., ibid., 42, No. 550, 571 (1970);
4. U.S. Pat. No. 3,423,351, Jan. 21, 1969;

a 1.2μ ($d_4$) emulsion, BA/MMA/MAA = 20/79.5/0.5, was prepared foe evaluation as a heat fusible coating vehicle.

The following procedures are suitably employed to prepare a heat fusible monosperse latex useful in the process of the invention.

| Stage A | Parts |
|---|---|
| $H_2O$ | 460.0 |
| Triton X-100[1] | 4.4 |
| Siponate DS-10 (23%)[2] | 1.65 |
| Potassium Persulfate (KPS) | 0.77 in 10 $H_2O$ |
| Butyl Acrylate (BA) | 30.0 |
| Methyl Methacrylate (MMA) | 119.25 |
| Methacrylic Acid (MAA) | 0.75 |
| Bromotrichloromethane (BTM) | 0.75 |

[1]polyethenoxy nonionic ether
[2]alkylarylsulfonate

Procedure:

Kettle water and "soap" mixture is heated to 70° and the monomer added. After adjustment of kettle temperature to 67°, persulfate is added and the temperature is maintained at 65°–67°. When monomer odor is nil, reaction is considered complete; the reaction product is then maintained at 65°–67° C. for an additional 30 minutes. The reaction product then is cooled and filtered.

| Constants: | | |
|---|---|---|
| | % T. S. | 24.4 |
| | Particle Size | 0.14μ ($d_4$) |
| | (estimated by disymmetry light scatter) | |
| Stage B | | Parts |
| | Product of Stage A | 186.0 |
| | Triton X-100 | 0.5 |
| | Siponate DS-10 | 0.1 |
| | $H_2O$ | 400.0 |
| | KPS | 0.6 in 20 $H_2O$ |
| | BA | 40.0 |
| | MMA | 159.0 |
| | MAA | 1.0 |
| | BTM | 1.0 |

Procedure:

Stage A emulsion, soap, and water are heated to 70° C. and monomer added. After several minutes with temperature adjusted to 67°, persulfate solution is added and temperature maintained at 65°–67° until monomer odor is nil. The reaction product then is maintained at 65°–67° for an additional 30 minutes. The reaction product then is cooled and filtered.

| Constants: | | |
|---|---|---|
| | % T. S. | 39.1 |
| | Particle Size | 0.35μ ($d_1$) |
| | (estimated by optical microscope) | |
| Stage C | | Parts |
| | Product of Stage B | 131.8 |
| | Triton X-100 | 1.5 |
| | Siponate DS-10 | 0.1 |
| | $H_2O$ | 350.0 |
| | KPS | 0.6 in 20 $H_2O$ |
| | BA | 40.0 |
| | MMA | 159.0 |
| | MAA | 1.0 |
| | BTM | 1.0 |

Procedure:
See Stage B.

| Constants: | | |
|---|---|---|
| | % T. S. | 35.8 |
| | Particle Size | 0.5μ ($d_1$) |
| | (estimated by optical microscope) | |
| Stage D | | Parts |
| | Product of Stage C | 165.3 |
| | Triton X-100 | 1.5 |
| | Siponate DS-10 | 0.05 |
| | $H_2O$ | 360.0 |
| | KPS | 0.6 in 20 $H_2O$ |
| | BA | 40.0 |
| | MMA | 159.0 |
| | MAA | 1.0 |
| | BTM | 1.0 |

Procedure:
See Stage B.

| Constants: | | |
|---|---|---|
| | % T. S. | 34.7 |
| | Particle Size | 0.8µ (d₁) |
| | (estimated by optical microscope) | |
| Stage E | | Parts |
| | Product of Stage D | 240.0 |
| | Triton X-100 | 1.0 |
| | Siponate DS-10 | 0.1 |
| | H₂O | 310.0 |
| | KPS | 0.6 in 20 H₂O |
| | BA | 40.0 |
| | MMA | 159.0 |
| | MAA | 1.0 |
| | BTM | 1.0 |

Procedure:
See Stage B.

| Constants: | | |
|---|---|---|
| | % T. S. | 36.6 |
| | Particle Size | 1.1µ (d₁) |
| | (estimated by optical microscope) | |

Electron microscopy of Stage E latex particles reveals a large particle size mode of mean diameter 1.2 microns ($d_4$), of heterogeneity index less than 1.1, and comprising 92 percent by volume of the total particle population. The remaining 8 percent of the population has a means diameter ($d_4$) of approximately 0.6 micron.

EXAMPLE 17

When Example 5 is repeated using the latex obtained from Stage E of the foregoing example, similar results are obtained.

I claim:

1. A method of coating coated or uncoated substrates comprising the steps of applying a coating of a nonpolluting aqueous latex or dispersion of a fusible water-insoluble addition polymer of ethylenically unsaturated monomers to the substrate, the polymeric particles in said dispersion being of a large number average diameter, as compared to usual emulsion polymerized dispersions, of from about 0.5 micron to about 10 microns, the particles being monodisperse, having a heterogeneity index of <1.7, calculated as the ratio of the weight or volume average diameter, $d_4$, to the number average diameter $d_1$, where $d_1 = \Sigma n_i d_i / \Sigma n_i$ and $d_4 = \Sigma n_i d_i^4 / \Sigma n_i d_i^3$, the minimum film-forming temperature of the composition being between about 10° C., and about 200° C., drying said coating under conditions such that the water evaporates substantially completely at a temperature below the minimum film-forming temperature of the coating and the particles pack uniformly so that the particles do not coalesce to a continuous film and the coating dries to a loosely coherent powdery uncracked layer, and heating the dry powdery coating to a temperature at which the particles fuse to a continuous, uncracked film, the thickness of the fused coating being between 0.1 mil and 10 mils.

2. The method of claim 1 in which the particles have a diameter of from about 0.8 to about 2 microns and a heterogeneity index of <1.3, and the polymer is an acrylic polymer having 0 percent to 60 percent of a vinyl aromatic monomer and a total of 0 percent to 10 percent of at least one olefinically unsaturated monomer having hydroxy, amido, aldehyde, carboxyl, amino, thiol, cyano, isocyanato, and epoxy groups, and monomers having the structure of formulas II, III, IV, V, and VI as defined in the foregoing specification, the weight average molecular weight of said polymer being between about 40,000 and about 400,000.

3. The method of claim 2 in which the minimum film forming temperature of the composition is from about 20° C. to about 100° C., said molecular weight being from about 80,000 to about 250,000.

4. The method of claim 3 in which a thickening agent is present in the composition.

5. The method of claim 4 in which said composition is pigmented.

6. The method of claim 4 in which said substrate is metallic.

7. The method of claim 4 in which said substrate is glass, whereby a shatterproof product is provided.

8. The method of claim 1 in which said fusible polymer is thermoplastic.

9. The method of claim 1 in which said fusible polymer is thermosetting.

10. The method of claim 2 in which said fusible polymer is thermoplastic.

11. The method of claim 2 in which said fusible polymer is thermosetting.

12. An article prepared by the method of claim 1.

13. An article prepared by the method of claim 2.

14. An article prepared by the method of claim 6.

15. An article prepared by the method of claim 7.

16. The method of claim 1, in which the coating is thermoplastic.

17. The method of claim 2, in which a finite amount of at least one of said monomers having the structure of said formulas is present and in which the coating is thermosetting.

* * * * *

UNITED STATES PATENT OFFICE
CERTIFICATE OF CORRECTION

PATENT NO. : 3,904,795
DATED : September 9, 1975
INVENTOR(S) : Andrew Mercurio

It is certified that error appears in the above-identified patent and that said Letters Patent are hereby corrected as shown below:

Column 2, line 3, after "these" insert "large".

Column 5, line 2 "$(d_4)$" should be --$(\bar{d}_4)$--, and all others throughout entire patent.

Column 5, line 36 "Caddle" should be --Cadle--.

Column 7, line 17 "40,000 to 400,000" should be --40,000 and 400,000--.

Column 7, line 57 "1" should be --$\underline{1}$--.

Column 8, line 61 "p-vinylbenzoic" should be --$\underline{p}$-vinylbenzoic--.

Column 12, line 2 "t-butylaminoethyl" should be --$\underline{t}$-butylaminoethyl--.

Column 14, line 36 "t-butyl" should be --$\underline{t}$-butyl--.

Column 14, line 53 "monionic" should be --nonionic--.

Column 15, line 53 "0.02" should be --0.20--.

Column 16, in the table, under heading "Baked Wet", "Smooth, blisters as above" should be deleted.

In heading "Ambient Dried, etc." after "no" insert "blisters (as above)".

Column 21, line 19 "MAA" should be --MMA--.

Column 21, line 51 "foe" should be --for--.

Signed and Sealed this ninth Day of December 1975

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

PATENT NO. : 3,904,795
DATED : September 9, 1975
INVENTOR(S) : Andrew Mercurio

It is certified that error appears in the above-identified patent and that said Letters Patent are hereby corrected as shown below:

In the Abstract:

Change to a complete sentence by deleting in line 9 of the abstract, "The dispersion".

Column 16, lines 53 and 54, delete "A second set of films is placed in a baking oven at 350° F. for 15 minutes".

Revise the table appearing in column 16, starting at line 57, with the following table:

| Film Thickness (mils) | Baked Wet | Ambient Dried | Ambient Dried, then Baked |
|---|---|---|---|
| 0.5 | Smooth, continuous, glossy film | Smooth, continuous, glossy film | Smooth, continuous glossy film |
| 1.3 | Smooth, glossy, but heavily mud-cracked, no blisters | No mudcracking, no blisters (as above) | No mudcracking, no blisters (as above) |
| 3 | Severely mudcracked, severely blistered | Moderate mudcracking, no blisters | Moderate mudcracking, no blisters |

Column 18, line 21, change "thickness" to --thicknesses--.

Signed and Sealed this third Day of February 1976

[SEAL]

Attest:

RUTH C. MASON
Attesting Officer

C. MARSHALL DANN
Commissioner of Patents and Trademarks